United States Patent
Xiang et al.

(10) Patent No.: US 12,440,022 B2
(45) Date of Patent: *Oct. 14, 2025

(54) DESK-MOUNTED LIFTING PLATFORM

(71) Applicant: Flexispot, Inc., Livermore, CA (US)

(72) Inventors: Lehong Xiang, Ningbo (CN); Tao Lin, Ningbo (CN); Fangyuan Li, Fangyuan (CN)

(73) Assignee: Flexispot, Inc., Livermore, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/733,645

(22) Filed: Apr. 29, 2022

(65) Prior Publication Data
US 2022/0257006 A1  Aug. 18, 2022

Related U.S. Application Data

(63) Continuation of application No. 17/094,334, filed on Nov. 10, 2020, now Pat. No. 11,382,419, which is a
(Continued)

(51) Int. Cl.
*A47B 21/02* (2006.01)
*A47B 21/03* (2006.01)
(Continued)

(52) U.S. Cl.
CPC .......... *A47B 21/02* (2013.01); *A47B 21/0314* (2013.01); *F16M 11/046* (2013.01);
(Continued)

(58) Field of Classification Search
CPC .............. F16M 11/24; F16M 11/2014; F16M 11/2092; F16M 2200/004;
(Continued)

(56) References Cited

U.S. PATENT DOCUMENTS 3,608,231 A * 9/1971 Sweeney ............... C10L 1/1666
3,823,915 A * 7/1974 Koehler .................. B66F 7/065
254/122
(Continued)

FOREIGN PATENT DOCUMENTS

CN  105124920 A * 12/2015
CN  204949970 U * 1/2016
(Continued)

OTHER PUBLICATIONS

CN105901942; Xiang et al; abstract and figure (Year: 2016).*
English translation of CN206590823 (Year: 2017).*

*Primary Examiner* — Janet M Wilkens
(74) *Attorney, Agent, or Firm* — Calfee, Halter & Griswold LLP

(57) ABSTRACT

A desk-mounted lifting platform comprises a workbench, an upper support and a lower support. The workbench is connected to the upper support. A first lifting arm and a second lifting arm are arranged between the upper support and the lower support. The first lifting arm and the second lifting arm are X-shaped and hinged at an intersection thereof. An upper end of the first lifting arm is hinged with the upper support. A lower end of the first lifting arm is slidably fitted on the lower support. A lower end of the second lifting arm is hinged with the lower support. An upper end of the second lifting arm is slidably fitted on the upper support. A gas spring is arranged between the upper support and the lower support. The gas spring provides a lifting force to lift the upper support.

8 Claims, 4 Drawing Sheets

Related U.S. Application Data continuation of application No. 15/861,756, filed on Jan. 4, 2018, now Pat. No. 10,869,549.

(51) Int. Cl.
  *F16M 11/04*   (2006.01)
  *F16M 11/38*   (2006.01)
  *A47B 9/16*    (2006.01)

(52) U.S. Cl.
  CPC ............... *F16M 11/38* (2013.01); *A47B 9/16* (2013.01); *F16M 2200/08* (2013.01)

(58) Field of Classification Search
  CPC ........... F16M 2200/063; F16M 11/046; F16M 11/38; F16M 2200/08; A47B 2021/0335; A47B 3/00; A47B 9/16; A47B 9/10; A47B 9/02; A47B 9/12; A47B 21/02; A47B 21/0073; A47B 21/0314; A47B 2200/0056; A47B 2200/0046; A47B 5/006; A47B 5/04; B66F 7/0608; B66F 7/065
  USPC ................. 312/306, 312, 208.1, 223.3, 196; 254/122; 108/144.11, 93, 96, 120, 43, 108/138, 33, 39, 14, 146, 145, 147, 136, 108/50.01, 50.02; 248/157, 277, 575, 248/588, 631, 164, 432, 439, 188.2, 550, 248/431, 280.11, 292.11, 919, 920, 923, 248/563
  See application file for complete search history.

(56) References Cited

U.S. PATENT DOCUMENTS

| | | | | |
|---|---|---|---|---|
| 6,257,372 | B1 * | 7/2001 | Schirmer | B66B 9/0853 |
| | | | | 187/269 |
| 10,244,861 | B1 * | 4/2019 | Poniatowski | A47B 21/02 |
| 10,258,148 | B1 * | 4/2019 | Donner | A47B 9/18 |
| 10,575,630 | B1 * | 3/2020 | Poniatowski | A47B 21/0314 |
| 10,869,549 | B2 * | 12/2020 | Xiang | A47B 21/02 |
| 2005/0120922 | A1 * | 6/2005 | Brooks | A47B 3/02 |
| | | | | 108/118 |
| 2017/0340104 | A1 * | 11/2017 | Chuang | B66F 7/085 |
| 2018/0055214 | A1 * | 3/2018 | Kim | A47B 9/10 |
| 2018/0103752 | A1 * | 4/2018 | Zhong | A47B 3/02 |
| 2020/0231079 | A1 * | 7/2020 | Lai | B62B 3/02 |
| 2020/0318780 | A1 * | 10/2020 | Abe | F16M 11/42 |

FOREIGN PATENT DOCUMENTS

| | | | |
|---|---|---|---|
| CN | 206590823 | * | 10/2017 |
| JP | 2017045506 A | * | 3/2017 |
| WO | WO-9117906 A | * | 11/1991 |

* cited by examiner

DESK-MOUNTED LIFTING PLATFORM

CROSS-REFERENCE TO RELATED APPLICATIONS

This application is a continuation of U.S. patent application Ser. No. 17/094,334, filed Nov. 10, 2020, which is a continuation of U.S. utility application Ser. No. 15/861,756, filed Jan. 4, 2018, now pending, which further claims priority to Chinese Patent Application No. 201720016977.1 with a filing date of Jan. 6, 2017. The content of the aforementioned applications, including any intervening amendments thereto, are incorporated herein by reference.

TECHNICAL FIELD

The present disclosure relates to the field of computer supports, and more particularly, to a desk-mounted lifting platform.

BACKGROUND OF THE PRESENT INVENTION

Tablet displays and tablet computers are becoming more common in ordinary families as the society continues developing, and matching supports thereof are emerging. A lifting platform to bear tablet computers in prior arts is also called a lifting workbench which is typically used on a desktop or tabletop. The Chinese patent application with a publication number of CN106165968A and a title of "lifting workbench" is available on the web site of the State Intellectual Property Office which discloses a structure comprising a first support rod, a second support rod and a plate. The plate is arranged above the first support rod and the second support rod through an elevating mechanism which enables vertical adjustment thereof. The upper ends of the first support rod and the second support rod are rotatably connected with the bottom surface of the plate, respectively. The elevating mechanism includes a first sliding rail, a support component, a gas spring and a first operating component. The present invention provides a workbench structure more reasonably structured. A gas spring structure is used as a power source which drives the upper end of the first support rod to move back and forth on the bottom surface of the plate. The lifting adjustment of the workbench can be achieved by operating the gas spring in connection with the first sliding rail, the support component, and the second sliding rail. When it is needed to lower the height of the workbench, it is only required to manually press the plate with a valve of the gas spring opened and close the valve of the gas spring after the plate has descended to a desired height. The gas spring of the lifting workbench of this structure is disposed horizontally. The lifting force applied by the gas spring of the lifting workbench to the workbench is weak when the lifting platform is located in or lowered to the lowest position. Therefore, the workbench rises very slowly from the lowest position and another spring to hold the gas spring in a stretched state needs to be arranged on the bottom of the plate of the lifting workbench. The spring can be used to provide an additional lifting force when the lifting workbench is in the lowest position. The lifting workbench of such a structured has a complicated structure and poor user experience for the lifting operations.

Besides, a lifting platform of prior arts is typically equipped with a keyboard tray which is connected to the bottom of the workbench by a support frame. The connection is usually a screwed connection, so the keyboard tray must be disassembled with hand tools when disassembling. The operation may involve trouble, and user experience may be poor due to the long time required to disassemble the keyboard tray.

SUMMARY OF PRESENT INVENTION

A technical problem to be solved by the present disclosure is to over the above defects of prior arts by providing a desk-mounted lifting platform with simple structures which provides stronger lifting force at the lowest position and good user experiences.

The technical solution of the present disclosure is to provide a desk-mounted lifting platform with the following structures: The desk-mounted lifting platform comprises a workbench, an upper support and a lower support. The workbench is connected to the upper support. A first lifting arm and a second lifting arm are arranged between the upper support and the lower support. The first lifting arm and the second lifting arm are X-shaped and hinged at an intersection thereof. An upper end of the first lifting arm is hinged with the upper support. A lower end of the first lifting arm is slidably fitted on the lower support. A lower end of the second lifting arm is hinged with the lower support. An upper end of the second lifting arm is slidably fitted on the upper support. A gas spring is arranged between the upper support and the lower support. The gas spring is used for providing a lifting force to lift the upper support. The upper support is provided with a handle to control the opening or closing of a valve of the gas spring through a brake line, and an axis of the gas spring intersects a working plane of the workbench obliquely.

The desk-mounted lifting platform of the present disclosure has the following advantages compared to prior arts by using the above structures: The axis of the gas spring of the desk-mounted lifting platform intersects the working plane of the workbench obliquely so that the gas spring would remain inclined. A piston rod of the gas spring can provide strong lifting force even if the workbench is at the lowest position without the need to further add an additional spring to enable fast stretching of the piston rod of the gas spring when the workbench is at the lowest position. Therefore, the desk-mounted lifting platform of the present disclosure has a simple structure. The gas spring provides balanced lifting force to lift the workbench as the workbench is lifted from the lowest position by using the optimized structures of the desk-mounted lifting platform of the present disclosure. Therefore, the lifting operation of the workbench can bring good user experiences.

In some embodiments, one end of the gas spring is hinged to an upper part of the first lifting arm or the second lifting arm, and the other end of the gas spring is hinged to the upper support.

In some embodiments, a bar is connected to the upper part of the first lifting arm. A connecting arm protruding downwards is connected to a bottom of the bar. One end of the gas spring is hinged to a free end of the connecting arm. The other end of the gas spring is hinged to the upper support. Having the gas spring hinged to a free end of the connecting arm further increases the tilt angle between the gas spring and the workbench, so that a balanced lifting force to lift the workbench can be provided by the gas spring. The problem of the weak lift force provided by the gas spring when the workbench is at the lowest position is solved.

In some embodiments, two protruding coaxial first rollers are arranged on two outer side walls of a lower end of the first lifting arm, and the lower support is provided with a first sliding rail slidably fitted with the two first rollers.

In some embodiments, two protruding coaxial second rollers are arranged on two outer side walls of an upper end of the second lifting arm, and the upper support is provided with a second sliding rail slidably fitted with the two second rollers.

In some embodiments, the platform further comprises a keyboard support. A support frame is connected to the upper support. A hanger matched with the support frame is connected to the keyboard support. The hanger is detachably connected with the support frame.

In some embodiments, at least one hanging rod is arranged on each of both outer side walls of the support frame. A hook matched with the hanging rod is arranged on the hanger. Locking screws are arranged on a connection position between the hanger and the support frame. It is only needed to hang the hook of the hanger on a hanging rod of the support frame and then lock the hanger to the support frame with locking screws when assembling the keyboard support. When disassembling the keyboard support, the locking screws should be unscrewed with hands and the hook can be moved out afterwards. Assembling and disassembling of the keyboard support can be conveniently performed without need of hand tools.

In some embodiments, the at least one hanging rod arranged on each of both outer side walls of the support frame comprises two hanging rods arranged respectively on each of both outer side walls of the support frame.

REFERENCE NUMBERS 1 workbench, 2 upper support, 3 lower support, 4 keyboard support, 5 handle, 6 first lifting arm, 7 second lifting arm, 8 gas spring, 9 bar, 10 connecting arm, 11 first sliding rail, 12 second rollers, 13 support frame, 14 hanger, 15 hanging rod, 16 hook, 17 locking screws, 31 brake line.

DETAILED DESCRIPTION OF PREFERRED EMBODIMENTS

The present disclosure would be described in greater detail hereinafter in combination with the accompanying drawings and embodiments.

Figure 1:
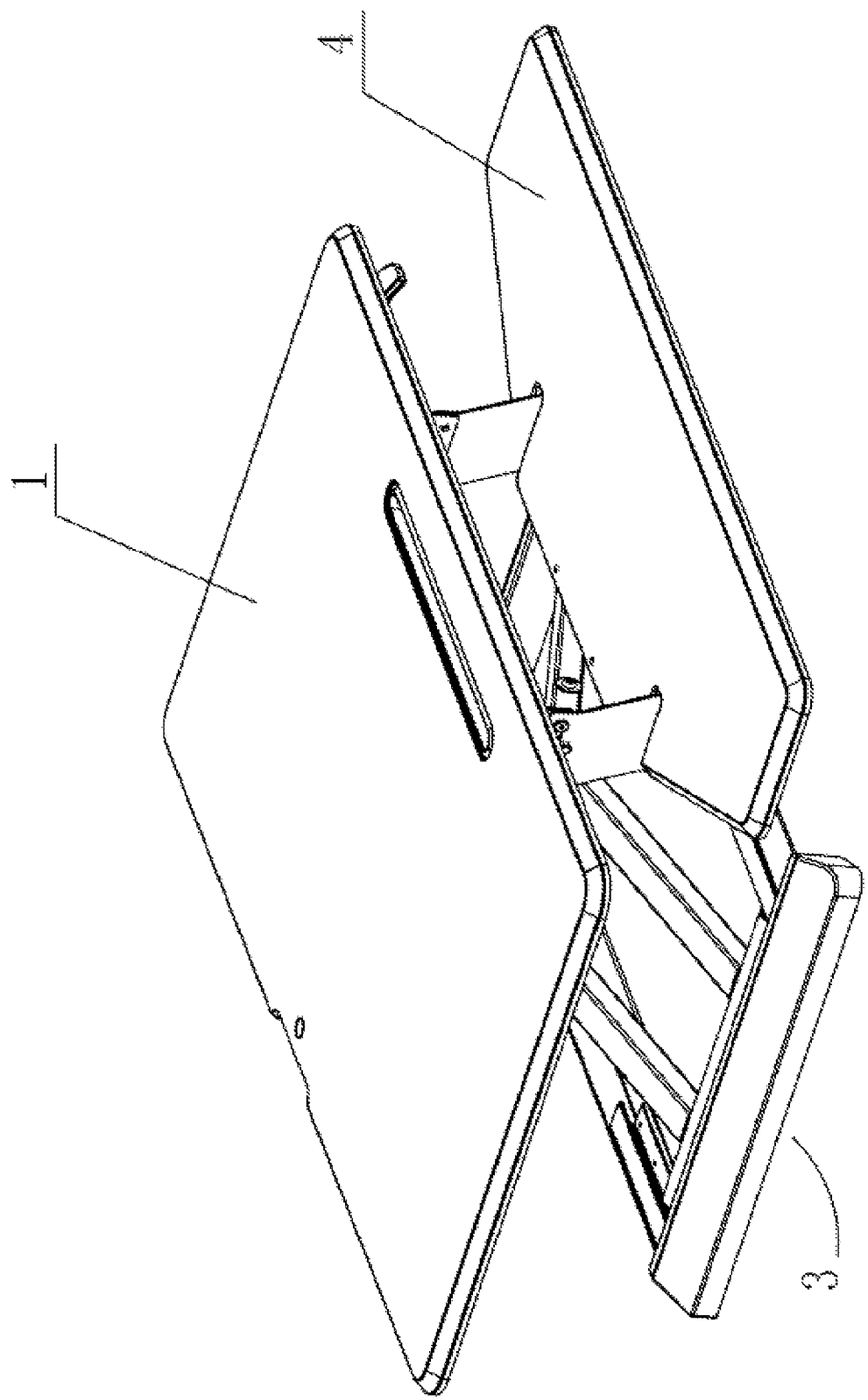
FIG. 1 is a schematic diagram of front structures of a desk-mounted lifting platform according to the present disclosure.
Figure 2:
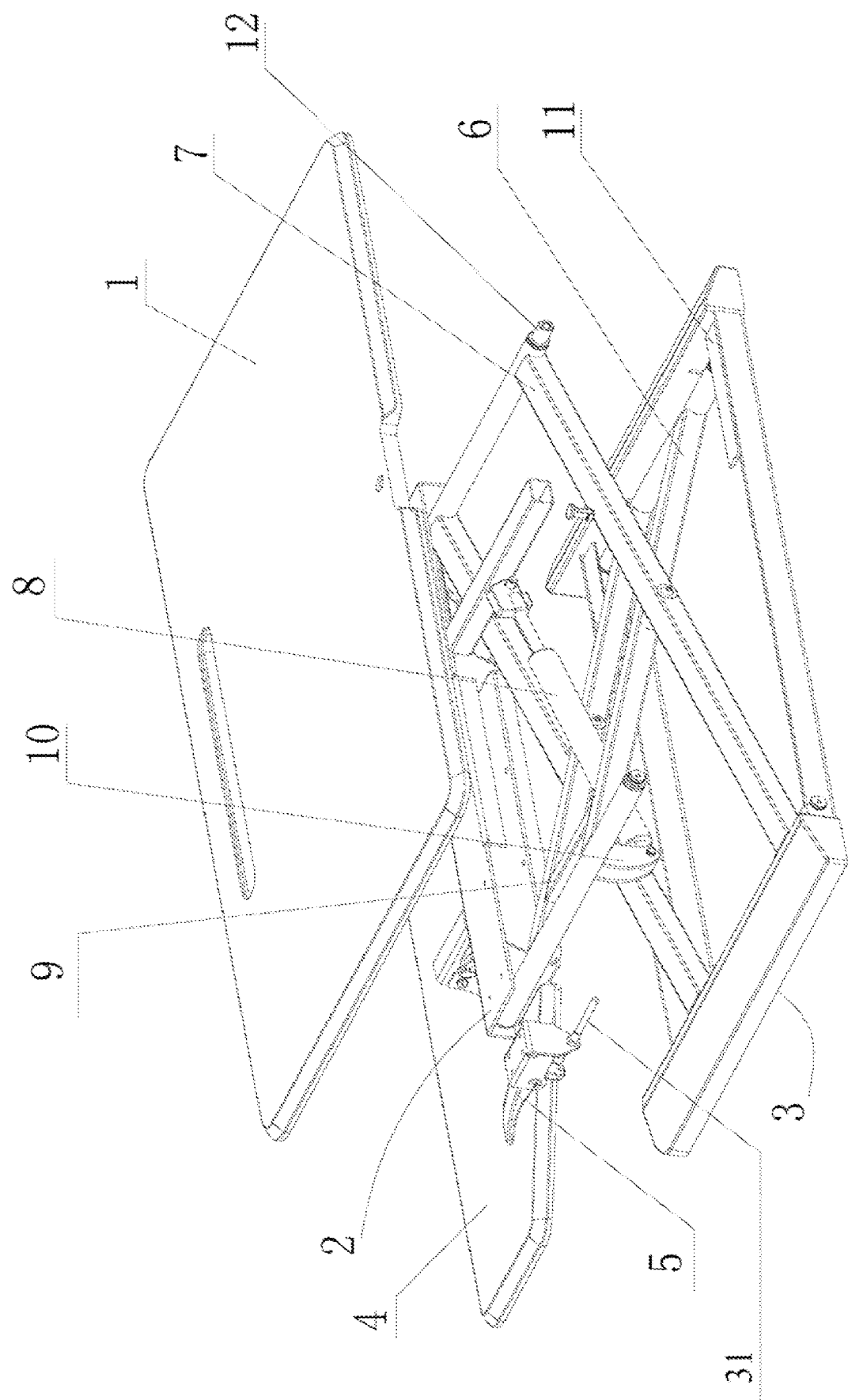
FIG. 2 is a schematic diagram of assembled structures of a desk-mounted lifting platform according to the present disclosure.
Figure 3:
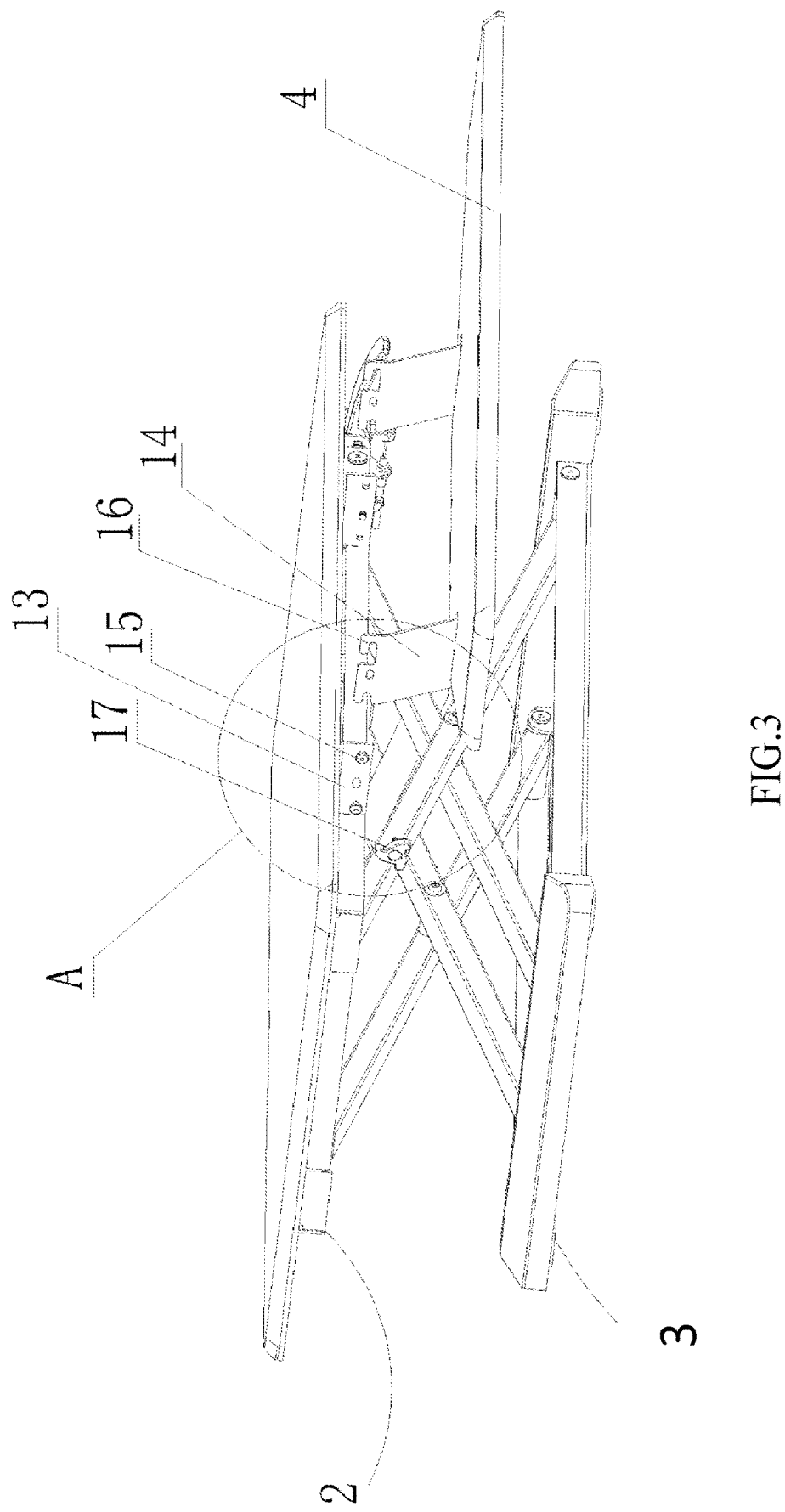
FIG. 3 is a schematic diagram of connecting structures of keyboard support of a desk-mounted lifting platform according to the present disclosure.
Figure 4:
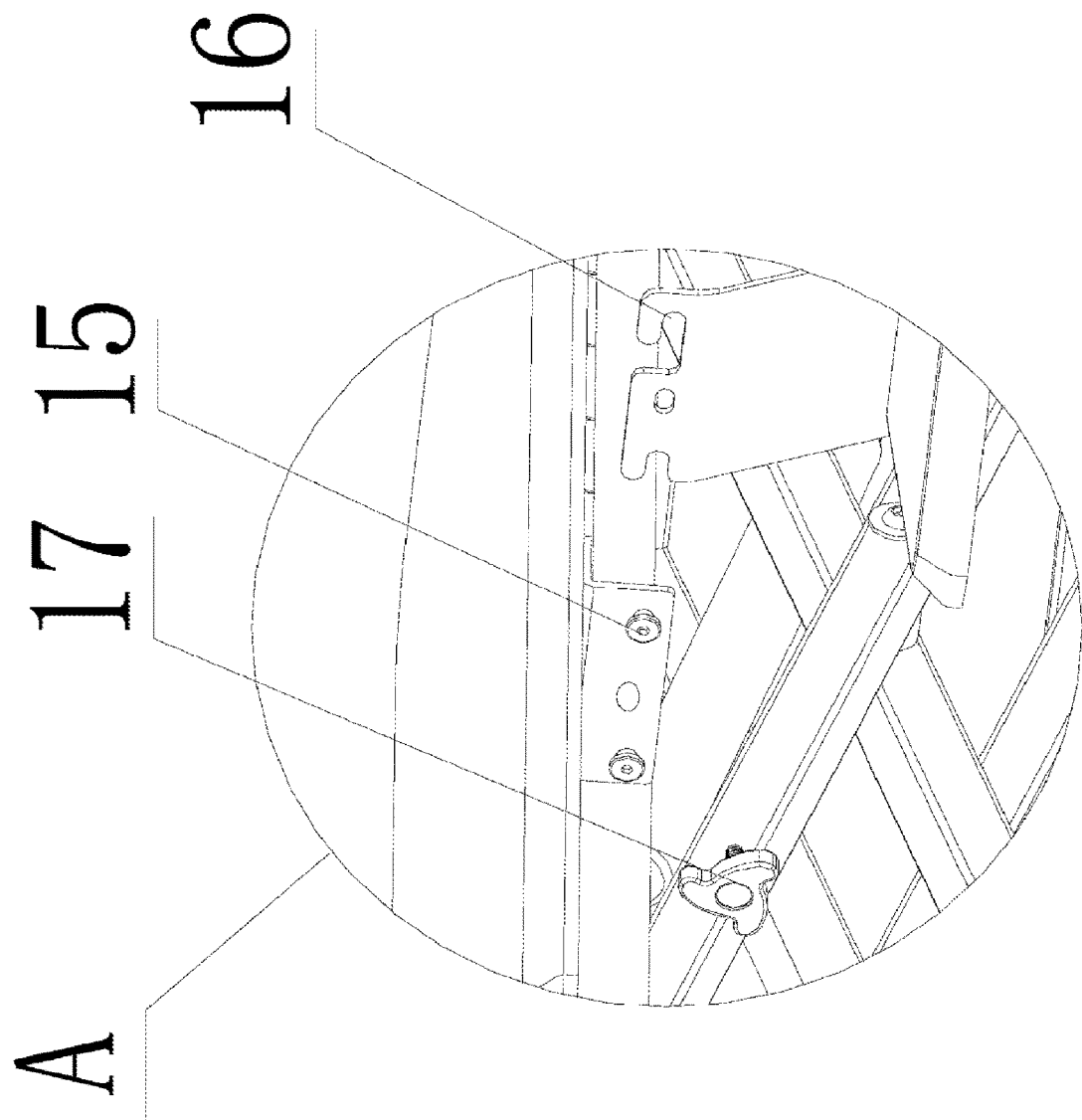
FIG. 4 is an enlarged portion of FIG. 3.

As shown in FIG. 1-3, a desk-mounted lifting platform according to the present disclosure comprises workbench 1, an upper support 2 and a lower support 3. The workbench 1 is connected to the upper support 2. A first lifting arm 6 and a second lifting arm 7 are arranged between the upper support 2 and the lower support 3. The first lifting arm 6 and the second lifting arm 7 are X-shaped and hinged at an intersection thereof. An upper end of the first lifting arm 6 is hinged with the upper support 2. A lower end of the first lifting arm 6 is slidably fitted on the lower support 3. A lower end of the second lifting arm 7 is hinged with the lower support 3. An upper end of the second lifting arm 7 is slidably fitted on the upper support 2. A gas spring 8 is arranged between the upper support 2 and the lower support 3. The gas spring 8 is used for providing a lifting force to lift the upper support 2. The upper support 2 is provided with a handle 5 to control the opening or closing of a valve of the gas spring 8 through a brake line 31. An axis of the gas spring 8 intersects a working plane of the workbench 1 obliquely.

One end of the gas spring 8 is hinged to an upper part of the first lifting arm 6 or the second lifting arm 7 via a free end of a connecting arm 10 protruding downward, and the other end of the gas spring 8 is hinged to the upper support 2.

A bar 9 is connected to the upper part of the first lifting arm 6. A connecting arm 10 protruding downwards is connected to a bottom of the bar 9. One end of the gas spring 8 is hinged to a free end of the connecting arm 10, and the other end of the gas spring 8 is hinged to the upper support 2.

Two protruding coaxial first rollers are arranged on two outer side walls of a lower end of the first lifting arm 6, and the lower support 3 is provided with a first sliding rail 11 slidably fitted with the two first rollers.

Two protruding coaxial second rollers 12 are arranged on two outer side walls of an upper end of the second lifting arm 7, and the upper support 2 is provided with a second sliding rail slidably fitted with the two second rollers 12.

The desk-mounted lifting platform further comprises a keyboard support 4. A support frame 13 is connected to the upper support 2. A hanger 14 matched with the support frame 13 is connected to the keyboard support 4, and the hanger 14 is detachably connected with the support frame 13.

At least one hanging rod 15 is arranged on each of both outer side walls of the support frame 13. A hook 16 matched with the hanging rod 15 is arranged on the hanger 14, and locking screws 17 are arranged on a connection position between the hanger 14 and the support frame 13.

The at least one hanging rod 15 arranged on each of both outer side walls of the support frame 13 comprises two hanging rods 15 arranged respectively on each of both outer side walls of the support frame 13.

What is claimed is:

1. A desk-mounted lifting platform comprising:
   a workbench,
   an upper support and a lower support, wherein the workbench is connected to the upper support,
   a first lifting arm and a second lifting arm arranged between the upper support and the lower support,
   a bar connected to an upper part of the first lifting arm, and a connecting arm protruding downwards from the bar,
   a gas spring, wherein an end of the gas spring is hinged to the connecting arm, and the other end of the gas spring is hinged to the upper support, and
   a handle to control the opening or closing of a valve of the gas spring through a brake line,
   wherein two protruding coaxial first rollers are arranged on two outer side walls of a lower end of the first lifting arm, and the lower support is provided with a first sliding rail slidably fitted with the two first rollers.

2. The desk-mounted lifting platform of claim 1, wherein the first lifting arm and the second lifting arm are X-shaped and hinged at an intersection thereof, an upper end of the first lifting arm is hinged with the upper support, a lower end of the first lifting arm is slidably fitted on the lower support, a lower end of the second lifting arm is hinged with the lower support, an upper end of the second lifting arm is slidably fitted on the upper support.

3. The desk-mounted lifting platform of claim 2, wherein the lower end of the first lifting arm is configured to slide on the lower support in a longitudinal direction with respect to the workbench, and the upper end of the second lifting arm is configured to slide on the upper support in the longitudinal direction with respect to the workbench.

4. The desk-mounted lifting platform of claim 1, wherein two protruding coaxial second rollers are arranged on two outer side walls of an upper end of the second lifting arm, and the upper support is provided with a second sliding rail slidably fitted with the two second rollers.

5. The desk-mounted lifting platform of claim 1, wherein the platform further comprises a keyboard support, a support frame is connected to the upper support, a hanger matched with the support frame is connected to the keyboard support, and the hanger is detachably connected with the support frame.

6. The desk-mounted lifting platform of claim 5, wherein at least one hanging rod is arranged on each of both outer side walls of the support frame, a hook matched with the hanging rod is arranged on the hanger, and locking screws are arranged on a connection position between the hanger and the support frame.

7. The desk-mounted lifting platform of claim 6, wherein the at least one hanging rod arranged on each of both outer side walls of the support frame comprises two hanging rods arranged respectively on each of both outer side walls of the support frame.

8. The desk-mounted lifting platform of claim 1, wherein the upper support is movable between a lowest position and a highest position in relation to the lower support, wherein an axis of the gas spring intersects a working plane of the workbench obliquely when the upper support is at the lowest position.

\* \* \* \* \*